United States Patent
Beifus et al.

(10) Patent No.: US 10,425,029 B1
(45) Date of Patent: Sep. 24, 2019

(54) MOTOR CONTROLLER FOR ELECTRIC BLOWER MOTORS

(71) Applicant: Regal Beloit America, Inc., Beloit, WI (US)

(72) Inventors: Brian L. Beifus, Fort Wayne, IN (US); Sanjeev Shirahatti, Xenia, OH (US); Paul S. Mullin, Yellow Springs, OH (US); Bin Yang, Fort Wayne, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 15/995,950

(22) Filed: Jun. 1, 2018

(51) Int. Cl.
| | |
|---|---|
| *H02P 23/12* | (2006.01) |
| *H02P 23/14* | (2006.01) |
| *H02P 23/00* | (2016.01) |
| *F24F 11/75* | (2018.01) |

(52) U.S. Cl.
CPC .......... *H02P 23/0027* (2013.01); *F24F 11/75* (2018.01); *H02P 23/14* (2013.01)

(58) Field of Classification Search
USPC .................. 318/264–286, 466–469, 626
See application file for complete search history.

(56) References Cited

U.S. PATENT DOCUMENTS

| | | | | |
|---|---|---|---|---|
| 4,860,231 A | * | 8/1989 | Ballard | .............. F23N 3/082 |
| | | | | 702/47 |
| 5,075,608 A | * | 12/1991 | Erdman | .............. F23N 3/082 |
| | | | | 318/400.22 |
| 5,616,995 A | * | 4/1997 | Hollenbeck | ............. F23N 1/062 |
| | | | | 318/432 |
| 5,736,823 A | | 4/1998 | Nordby et al. | |
| 6,624,606 B2 | | 9/2003 | Kushida et al. | |
| 7,023,166 B1 | | 4/2006 | Kohen et al. | |
| 7,567,049 B2 | | 7/2009 | Shahi et al. | |
| 8,207,694 B2 | | 6/2012 | Izumi et al. | |
| 8,242,723 B2 | * | 8/2012 | Green | ................... F24F 11/006 |
| | | | | 318/400.01 |
| 8,380,354 B2 | * | 2/2013 | Zhao | ...................... G05D 23/19 |
| | | | | 236/44 C |
| 8,408,878 B2 | | 4/2013 | Shahi et al. | |
| 8,692,492 B2 | | 4/2014 | Sato | |
| 9,625,172 B2 | | 4/2017 | Sasaki | |
| 9,631,830 B2 | | 4/2017 | Sasaki | |
| 9,732,976 B2 | | 8/2017 | Wang et al. | |
| 2004/0026522 A1 | * | 2/2004 | Keen | ................. B60H 1/00792 |
| | | | | 236/49.3 |
| 2004/0232864 A1 | | 11/2004 | Sunaga et al. | |
| 2010/0076606 A1 | | 3/2010 | Gatley et al. | |
| 2015/0233380 A1 | | 8/2015 | Sasaki et al. | |

\* cited by examiner

*Primary Examiner* — Bentsu Ro
(74) *Attorney, Agent, or Firm* — Armstrong Teasdale LLP

(57) ABSTRACT

A motor controller for an electric motor includes a drive circuit that regulates power supplied to a stator of the electric motor to turn a rotor. The motor controller includes a communication interface that receives coefficients. The motor controller includes a processor coupled to the drive circuit. The processor receives an airflow rate demand, computes a speed, computes a torque set point as a function of at least a sum of first and second terms. The first term is defined as the first coefficient multiplied by the airflow rate demand raised to a power greater than one, and the second term is defined as the second coefficient multiplied by the speed raised to a power greater than one. The processor controls the drive circuit based on the torque set point to supply electrical power to the electric motor.

20 Claims, 5 Drawing Sheets

MOTOR CONTROLLER FOR ELECTRIC BLOWER MOTORS

BACKGROUND

The field of the disclosure relates generally to a motor controller for electric blower motors and, more specifically, a motor controller that enables approximately constant airflow production.

At least some electric motors are torque-calibrated when manufactured to ensure the torque output at the drive shaft of the electric motor matches the torque commanded. At least some electric motors, particularly electric motors driving blowers, such as a forward curve blower, are further calibrated to produce approximately a constant airflow during operation in either a torque-control mode or a speed-control mode. Such a calibration, or characterization, quantizes airflow output for a given speed and torque output when driving the blower. The actual airflow output can vary according to the blower construction, duct, or other airflow restriction into which the airflow is directed.

Constant airflow heating, ventilation, and air conditioning (HVAC) systems improve thermal comfort and energy savings. Constant airflow systems may also be used in certain refrigeration systems. In a constant airflow system, a motor controller for an electric blower motor receives an airflow rate demand, e.g., a value in cubic feet per minute (CFM), and then determines, e.g., by a polynomial or constant airflow algorithm, an appropriate motor torque or motor speed to produce approximately the airflow demanded. In a torque-controlled implementation, for example, motor torque is regulated based on a monitored motor speed to produce the approximate airflow. The estimation of actual airflow produced for a given motor torque and motor speed is subject to various sources of variation due to differences in blower designs and applications. Estimations of actual airflow are particularly vulnerable to error for low airflow rate demands, i.e., low-volume airflows. A motor controller that improves accuracy of actual airflow estimations, particularly at low airflow rate demands, is desired.

BRIEF DESCRIPTION

In one aspect, a motor controller for an electric motor includes a drive circuit, a communication interface, and a processor. The electric motor is configured to drive a blower to generate an airflow. The drive circuit is configured to regulate electrical power supplied to a stator of the electric motor to turn a rotor of the electric motor and generate the airflow. The communication interface is configured to receive a plurality of coefficient values including at least a first coefficient value and a second coefficient value. The processor is coupled to the drive circuit and is configured to receive an airflow rate demand value, and compute a speed of the electric motor. The processor is configured to compute a torque set point for the electric motor as a function of at least a sum of a first term and a second term, the first term defined as the airflow rate demand value raised to a power greater than one, and then multiplied by the first coefficient value, and the second term is defined as the speed raised to a power greater than one, and then multiplied by the second coefficient value. The processor is configured to control the drive circuit based on the torque set point to supply electrical power to the electric motor and to operate the blower to generate the airflow.

In another aspect, a method of operating an electric motor configured to drive a blower to generate an airflow. The method includes receiving an airflow rate demand value from a system controller. The method includes receiving a plurality of coefficient values including at least a first coefficient value and a second coefficient value. The method includes receiving a speed of the electric motor. The method includes computing a torque set point for the electric motor as a function of at least a sum of a first term and a second term, the first term defined as the airflow rate demand value raised to a power greater than one, and then multiplied by the first coefficient value, and the second term defined as the speed raised to a power greater than one, and then multiplied by the second coefficient value. The method controlling a drive circuit for the electric motor based on the torque set point to supply electrical power to the electric motor and to operate the blower to generate the airflow.

In yet another aspect, a constant airflow system is provided. The constant airflow system includes a blower, an electric motor, a sensor, and a motor controller. The electric motor is coupled to and configured to drive the blower to generate an airflow. The electric motor includes a stator and a rotor coupled to the blower. The sensor is coupled to the electric motor and is configured to measure a speed of the electric motor. The motor controller is coupled to the sensor and the drive circuit. The motor controller includes a drive circuit configured to regulate electrical power supplied to the stator to turn the rotor and the blower to generate the airflow. The motor controller includes a processor configured to receive an airflow rate demand value and a plurality of coefficient values including at least a first coefficient value and a second coefficient value. The processor is configured to compute a torque set point for the electric motor as function of at least a sum of a first term and a second term, the first term defined as the airflow rate demand value raised to a power greater than one, and then multiplied by the first coefficient value, and the second term is defined as the speed raised to a power greater than one, and then multiplied by the second coefficient value. The processor is configured to control the drive circuit based on the torque set point to supply electrical power to the stator to operate the blower to generate the airflow.

DETAILED DESCRIPTION

Figure 1:
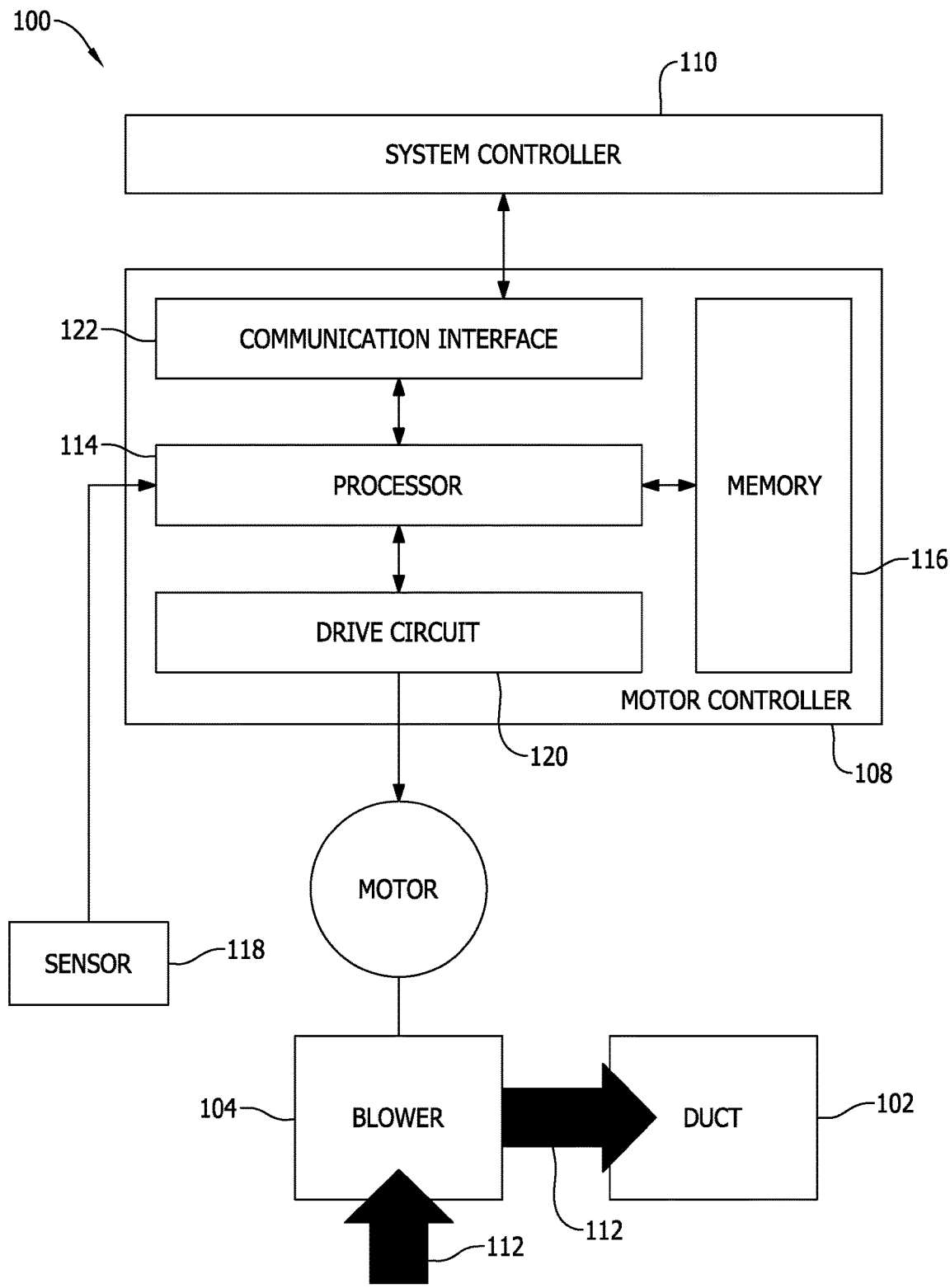
FIG. 1 is a block diagram of an exemplary constant airflow system.

Embodiments of the motor controller and methods of operating an electric blower motor for a constant airflow system described herein provide improved characterization of the electric blower motor based on motor torque, motor speed, and airflow. In a torque-controlled implementation, for example, the characterization embodied in the motor controller and methods described herein produces three or more torque-speed-airflow data points that define a surface that characterizes the operating profile of the constant airflow system. That surface is then approximated by a polynomial, airflow algorithm, or formula, that defines motor torque (T) as a function of motor speed (N) and airflow rate demand (Q). Likewise, in a speed-controlled implementation, for example, the characterization embodied in the motor controller and methods described herein again produces numerous torque-speed-airflow data points that define a surface that characterizes the operating profile of the constant airflow system. That surface is then approximated by a polynomial, airflow algorithm, or formula, that defines motor speed (N) as a function of motor torque (T) and airflow rate demand (Q). In an alternative speed-controlled embodiment, the formula for motor torque (T) described above may be used to compare a computed torque to a torque value in a speed-torque pair for the desired motor speed (N). A torque error value resulting from the comparison may then be used to drive the motor speed (N) to a target, or objective, value. In another alternative embodiment, motor power may be defined as a function of motor speed (N), motor torque (T), and airflow rate demand (Q). In either embodiment, the characterization described herein yields values for various coefficients that scale the various algebraic terms of the polynomial. The polynomial is sometimes referred to as a constant airflow algorithm. However, it is generally understood the actual airflow produced by such a constant airflow system using a constant airflow algorithm only approximates the demanded airflow due to numerous sources of error and variabilities in environmental and physical properties of the constant airflow system and the duct into which the airflow is directed.

Generally, a constant airflow algorithm having more terms produces a finer fit to the data collected during characterization and, therefore, yields more accurate estimates of actual airflow. The fit of a given constant airflow algorithm may be further improved by enabling non-integer (e.g., real number) values for one or more coefficients or exponents. Consequently, electric motors and motor controllers must have sufficient processors, memory, communication interfaces, and software to program, store, recall, and execute such constant airflow algorithms. Moreover, a greater number of terms and non-integer coefficients in the constant airflow algorithm generally correlates to heavier computation loads in deriving the necessary coefficients. Generally, another consequence of utilizing more terms to produce a finer fit to the data collected during characterization, is that any gaps in the data, e.g., under-sampling, or outlier data points are captured in the resulting surface, giving the resulting surface undesirable contours, or possibly poles, that, accordingly, produce inaccurate airflow during operation, particularly at extrema of the operating profile of the electric motor and blower. Conversely, with fewer terms and a coarser fit to the data, the regression analysis tends to "filter," or "smooth," gaps in the data and outlier data points, thereby producing a surface having gentler contours and more accurate airflow production at extrema of the operating profile.

In torque-controlled embodiments of the motor controller and methods described herein, motor torque may be defined by the following nine-term airflow algorithm, i.e., a constant airflow algorithm:

$$T(N,Q)=a_0+a_1Q+a_2N+a_3Q^2+a_4QN+a_5N^2+a_6Q^3+a_7Q^2N+a_8QN^2 \qquad \text{EQ. 1}$$

where, $a_0$, $a_1$, $a_2$, $a_3$, $a_4$, $a_5$, $a_6$, $a_7$, and $a_8$ are coefficient values determined during characterization.

Alternatively, in torque-controlled embodiments of the motor controller and methods described herein, motor torque may be defined by the following alternative six-term seven-coefficient airflow algorithm, i.e., constant airflow algorithm:

$$T(N,Q)=a_0+a_1Q+a_2N+a_3N^{a6}+a_4Q^{1.95}+a_5QN. \qquad \text{EQ. 2}$$

At least some known electric motors and motor controllers lack the communications interface or software transmit, store, and execute constant airflow algorithms having more than five terms. Further, at least some known electric motors and motor controllers lack the software or firmware to execute certain non-integer mathematical operations, such as, for example, non-integer exponents. Consequently, such motor controllers would require new communications interfaces or software to retrofit to enable, for example, the nine-term or seven-term constant airflow algorithms shown above in EQ. 1 and EQ. 2. Alternatively, in other torque-controlled embodiments of the motor controller and methods described herein, motor torque may be defined by the following alternative five-term airflow algorithm, i.e., constant airflow algorithm:

$$T(N,Q)=a_0+a_1N+a_2N^k a_3Q^j+a_4QN. \qquad \text{EQ. 3}$$

where k and j are constant values determined before performing, for example, regression analysis to determine coefficients $a_0$, $a_1$, $a_2$, $a_3$, $a_4$, $a_5$, $a_6$, $a_7$, and $a_8$. For example, in certain embodiments, k=1.6 and j=1.95.

Alternatively, in speed-controlled embodiments of the motor controller and methods described herein, motor speed may be defined by the following airflow algorithm, i.e., constant airflow algorithm:

$$N(T,Q) = a_0 + a_1 Q + a_2 T \qquad \text{EQ. 4}$$
$$a_3 T^j + \frac{a_4}{Q^k} + \frac{a_5 T}{Q}.$$

where j and k are constant values determined before performing, for example, regression analysis to determine coefficients $a_0$, $a_1$, $a_2$, $a_3$, $a_4$, and $a_5$. For example, in certain embodiments, k=0.5 and j=0.5.

Prior to operation of the motor controller described herein, the motor controller receives values for coefficients (A) that result from a regression analysis of characterization data for the electric motor and blower. The coefficients (A) correspond to programmable variables within a selected constant airflow algorithm stored in memory on the motor controller and executable by a processor during operation. In certain embodiments, certain other constants for the constant airflow algorithm, or alternative constant airflow algorithms, may be defined and stored, for example, in a non-volatile memory such as an EEPROM. In certain embodiments, the values for coefficients (A) may be received from an external system controller or other device over a wired or wireless communication channel. In another alternative embodiment, the values for coefficients (A) may be programmed into the motor controller by a technician or installer when the motor controller is installed.

During operation, the motor controller generally receives an airflow rate demand (Q) from an external system controller and one of motor torque (T) and motor speed (N) measured at the motor. The other of motor torque (T) and motor speed (N) is computed. For example, in a torque-controlled embodiment, the system controller transmits an airflow rate demand (Q) to the motor controller, and the motor controller computes a motor torque (T) to be commanded of the electric blower motor based on a measured motor speed (N). In an alternative embodiment, the system controller transmits a discrete selection, or an index, of a particular airflow rate demand (Q) from among a plurality of values stored in a table in memory. Motor speed (N) may be determined from the current signal supplied to the stator windings or, alternatively, may be measured directly by a sensor. The torque control loop then recursively executes, or iterates, until motor torque (T) converges on an objective torque. The torque control loop may execute, for example, once every 100 milliseconds. In alternative embodiments, the torque control loop period may be lengthened or shortened depending on, for example, the specific electric motor, blower, or duct configuration.

Likewise, in a speed-controlled embodiment, the system controller transmits an airflow rate demand (Q) to the motor controller, and the motor controller computes a motor speed (N) to be commanded of the electric blower motor based on a measured motor torque (T). As described above with respect to motor speed (N), motor torque (T) may be determined from the current signal supplied to the stator windings or, alternatively, may be measured directly by a sensor. The speed control loop then iterates until motor speed (N) converges on an objective speed.

FIG. 1 is a block diagram of a constant airflow system 100. System 100 includes a duct 102, a blower 104, an electric motor 106, a motor controller 108, and a system controller 110. In other embodiments, system 100 may include additional, fewer, or alternative components, including those described elsewhere herein.

Blower 104 is configured to generate an airflow 112 directed through duct 102. In at least some embodiments, blower 104 is a forward-curved centrifugal blower. In other embodiments, blower 104 is a different type of blower. Duct 102 is configured to guide the airflow for circulation and distribution within a building, vehicle, or other structure. Duct 102 has an airflow restriction that affects the airflow output from blower 104. The airflow restriction is based on various parameters that may affect airflow within system 100, such as, but not limited to, the internal dimensions of duct 102, open or closed dampers, contaminants (e.g., dust) within duct 102, the geometry of duct 102, and the like.

Electric motor 106 is configured to drive blower 104 to generate the airflow 112 into duct 102. In at least some embodiments, electric motor 106 is an induction motor configured to convert electrical power into mechanical power. In alternative embodiments, electric motor 106 is a permanent magnet motor. In one example, electric motor 106 is coupled to a wheel (not shown) of blower 104 and is configured to rotate the wheel. In the exemplary embodiment, electric motor 106 is configured to operate at a plurality of torque output levels (i.e., torque-controlled) to increase or decrease a corresponding motor speed. Increasing or decreasing the motor speed of electric motor 106 causes electric motor 106 to drive blower 104 to generate corresponding airflows. The airflow 112 generated by blower 104 is at least partially a function of the motor speed of electric motor 106 and the airflow restriction of duct 102. In some embodiments, electric motor 106 is integrated with blower 104.

Alternatively, electric motor 106 is configured to operate at a plurality of speed output levels (i.e., speed-controlled) to increase or decrease a corresponding motor torque. As in the torque-controlled embodiments, increasing or decreasing the torque of electric motor 106 causes electric motor 106 to drive blower 104 to generate corresponding airflows.

Motor controller 108 is communicatively coupled to electric motor 106 to operate electric motor 106. More specifically, motor controller 108 supplies electrical power of a certain current and frequency to the stator windings of electric motor 106 to operate electric motor 106. By adjusting the current and frequency, motor controller 108 controls the torque (or alternatively speed in a speed-controlled embodiment) of the electric motor 106, thereby facilitating control of the speed of electric motor 106. In other embodiments, motor controller 108 may be communicatively coupled to a second controller (not shown) associated with electric motor 106. In such embodiments, motor controller 108 may be configured to transmit control signals to the second controller to instruct the second controller to operate electric motor 106. In such an embodiment, motor controller 108 may be separated, or remote, from electric motor 106. For example, motor controller 108 may be located within an HVAC assembly along with blower 104 and electric motor 106. In another embodiment, for example, motor controller 108 may be located with a thermostat system or system controller 110.

Motor controller 108 includes a processor 114, a memory 116 communicatively coupled to processor 114, and a sensor system 118. Processor 114 is configured to execute instructions stored within memory 116 to cause motor controller 108 to function as described herein. For example, memory 116 is configured to store a constant airflow algorithm to be executed by processor 114. Memory 116 is further configured to store a plurality of coefficient values for use in the constant airflow algorithm. Moreover, memory 116 is configured to store data to facilitate calibrating electric motor 106. In some embodiments, motor controller 108 may include a plurality of processors 114 and/or memories 116. In other embodiments, memory 116 may be integrated with processor 114. In one example, memory 116 includes a plurality of data storage devices to store instructions and data as described herein.

Sensor system 118 includes one or more sensors that are configured to monitor electric motor 106. In certain embodiments, sensor system 118 is omitted and motor torque and speed are determined from the current signal supplied to the stator windings of electric motor 106. In one embodiment, sensor system 118 is configured to monitor a frequency output of motor controller 108 to electric motor 106. Sensor system 118 may monitor other data associated with electric motor 106, such as, but not limited to, motor speed, torque, power, and the like. In certain embodiments, sensor system 118 is configured to monitor an airflow output of blower 104. For example, sensor system 118 may include an air pressure sensor configured to monitor air pressure within duct 102. In some embodiments, sensor system 118 monitors electric motor 106 from motor controller 108. In such embodiments, sensor system 118 may be integrated with processor 114. In other embodiments, at least some sensors of sensor system 118 may be installed on electric motor 106 and transmit sensor data back to motor controller 108.

In one embodiment, motor controller 108 is configured to calibrate electric motor 106 for a plurality of airflow output levels to determine corresponding pairs of torque and speed. The resulting airflow-torque-speed data points define a surface that further defines the operating profile of constant airflow system 100.

Motor controller 108 includes a drive circuit 120. Drive circuit 120 supplies electric power to the stator windings of electric motor 106 based on control signals received from processor 114. Drive circuit 120 may include, for example, various power electronics for conditioning line frequency alternating current (AC) power to be supplied to the stator windings of electric motor 106 with a desired current, i.e., phase and amplitude, and frequency. Such power electronics may include, for example, and without limitation, one or more rectifier stages, power factor correction (PFC) circuits, filters, transient protection circuits, EMF protection circuits, inverters, or power semiconductors.

Motor controller 108 includes a communication interface 122. Communications interface 122 may include one or more wired or wireless hardware interface, such as, for example, universal serial bus (USB), RS232 or other serial bus, CAN bus, Ethernet, near field communication (NFC), WiFi, Bluetooth, or any other suitable digital or analog interface for establishing one or more communication channels between system controller 110 and motor controller 108. For example, in certain embodiments, one or more parameters, such as a maximum airflow rate (expressed in cubic feet per minute), airflow rate demand, or one or more coefficient values, may be communicated to motor controller 108 through communications interface 122 using a pulse-width modulated signal. Communications interface 122 further includes a software or firmware interface for receiving one or more motor control parameters and writing them, for example, to memory 116. In certain embodiments, communication interface 122 includes, for example, a software application programming interface (API) for supplying one or more coefficient values for a constant airflow algorithm. In such embodiments, received coefficient values are supplied to processor 114, processed, and stored in memory 116 along with a constant airflow algorithm for subsequent execution by processor 114 during operation of electric motor 106.

In certain embodiments, memory 116 is configured to store two or more constant airflow algorithms. Alternatively, memory 116 may be configured to store a single constant airflow algorithm and one or more sets of constants to be utilized by that algorithm. For example, in one embodiment, memory 116 is configured to store the seven-term constant airflow algorithm shown in EQ. 2. When electric motor 106 and motor controller 108 are configured to receive seven or more coefficients, processor 114 is configured to receive the coefficients through communication interface 122 and utilize those coefficients with the constant airflow algorithm. Alternatively, where communications interface 122 includes hardware or software interfaces that are limited to communication of five terms for a constant airflow algorithm, processor 114 is configured to retrieve a set of constants to be utilized with five of the seven coefficients that may be transmitted through communication interface 122. For example, $a_2$ or $a_3$ may be programmed, or hard-coded, in memory 116 to a constant value, e.g., 1, or $a_6$ may be programmed in memory 116 to a constant value, e.g., 1. Accordingly, for such limited motor controllers 108, a constant airflow algorithm having greater than five terms may be utilized.

Figure 2:
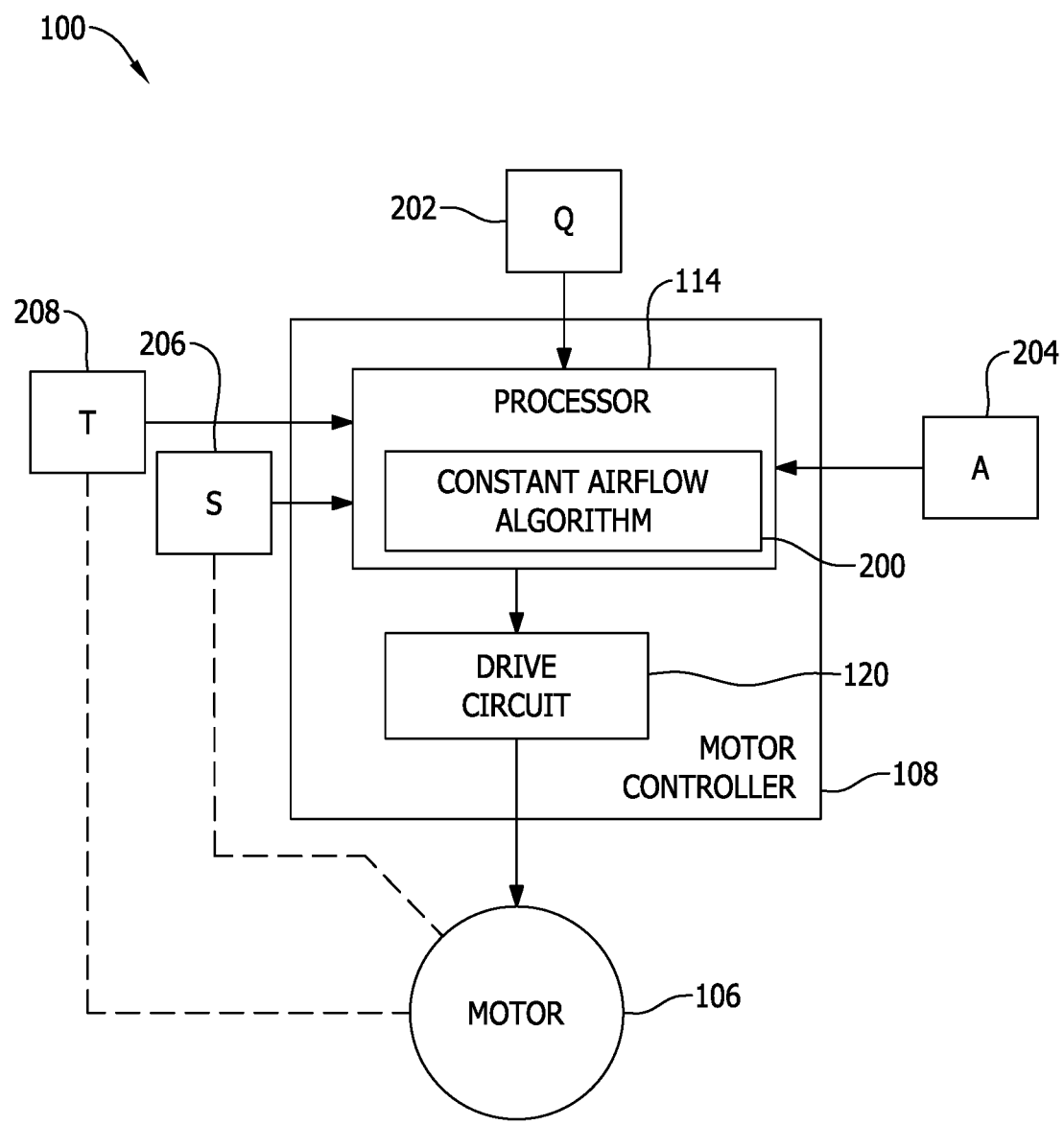
FIG. 2 is a logical block diagram of the constant airflow system shown in FIG. 1.

FIG. 2 is a logical block diagram of constant airflow system 100, including electric motor 106 and motor controller 108 (shown in FIG. 1). Processor 114 transmits control signals to drive circuit 120 to control the current and frequency of the electric power supplied to electric motor 106. Processor 114 executes, for example, a constant airflow algorithm 200, such as that described above in EQ. 1, EQ. 2, or EQ. 3 to compute one of a torque set point and a speed set point for controlling drive circuit 120 and electric motor 106. Execution of the algorithm is typically carried out periodically, e.g., at 10 Hertz, to update the torque set point or the speed set point. During operation, processor 114 receives an airflow rate demand value, Q, 202 that is used in constant airflow algorithm 200. Processor 114, in certain embodiments, may receive airflow rate demand value, Q, 202, directly from a system controller, such as system controller 110 (shown in FIG. 1). Alternatively, system controller 110 may supply airflow rate demand value, Q, 202 using discrete inputs representing an index into a table of airflow rate demand values stored in a memory from which processor 114 receives airflow rate demand value, Q, 202. Alternatively, system controller 110 may supply a pulse width modulated (PWM) signal that proportionately varies between two airflow rate demand values. In yet another alternative embodiment, system controller 110 may supply a digital command including airflow rate demand value, Q, 202.

Processor 114 also receives coefficient values, A, 204 that are used in constant airflow algorithm 200. Coefficient values, A, 204 may be received, for example, from system controller 110, from a memory, such as memory 116 (shown in FIG. 1), or from another external device. In certain embodiments, processor 114 receives coefficient values, A, 204 when constant airflow system 100 is, for example, manufactured, installed, or powered on, and processor 114 operates with those same values from that point on unless it is reset, reprogrammed, or recalibrated by a technician or other user. In other embodiments, processor 114 may receive a periodic update of coefficient values, A, 204 from a remote device and constant airflow algorithm 200 utilizes the latest values for a given iteration.

In certain embodiments, constant airflow algorithm 200 is selected from among multiple algorithms stored in memory 116. Memory 116 may include, for example, read-only memory such as an EEPROM. Constant airflow algorithm 200 is retrieved from memory 116 based on a user selection or a selection by system controller 110. In turn, for example, system controller 110 then transmits corresponding coefficient values, A, 204, a corresponding memory address for the space in memory 116 containing the appropriate coefficient values, A, 204, or an identifier, or "pointer," to such a memory address to processor 114. Processor 114 then gains access to the corresponding space in memory 116 and reads coefficient values, A, 204.

Processor 114 receives at least one of a measured speed, N, 206 and a measured torque 208 of electric motor 106. That is used in constant airflow algorithm 200. Measured speed, N, 206, for example, may be derived from a current signal supplied to the stator windings of electric motor 106. For example, such a current signal may be measured by a current sensor and measured speed, N, 206 is derived from that measurement. Alternatively, processor 114 may receive a frequency measurement from a frequency sensor on electric motor 106, the output of which may be converted to measured speed, N, 206. Alternatively, motor speed may be measured by any other suitable method, such as by further analyzing the current signal supplied to the stator windings of electric motor 106. Measured torque, T, 208, for example, may be derived from the current signal supplied to the stator windings of electric motor 106. For example, such a current signal may be measured by a current sensor and measured torque, T, 208 is derived from that measurement, e.g., by inference that torque output is equal to the commanded torque by virtue of a closed loop control system. Alternatively, processor 114 may receive a torque measurement from a torque sensor on electric motor 106 or, alternatively, by any other suitable method.

During operation, processor 114 executes constant airflow algorithm 200 using the several inputs described above, including airflow rate demand value, Q, 202, and at least one of measured speed, N, 206 and measured torque, T, 208. Upon execution of constant airflow algorithm 200, processor 114 computes one of a torque set point and a speed set point that is used to control drive circuit 120. Drive circuit 120 then supplies the desired current and frequency of AC electric power to electric motor 106 to turn blower 104 (shown in FIG. 1).

Figure 3:
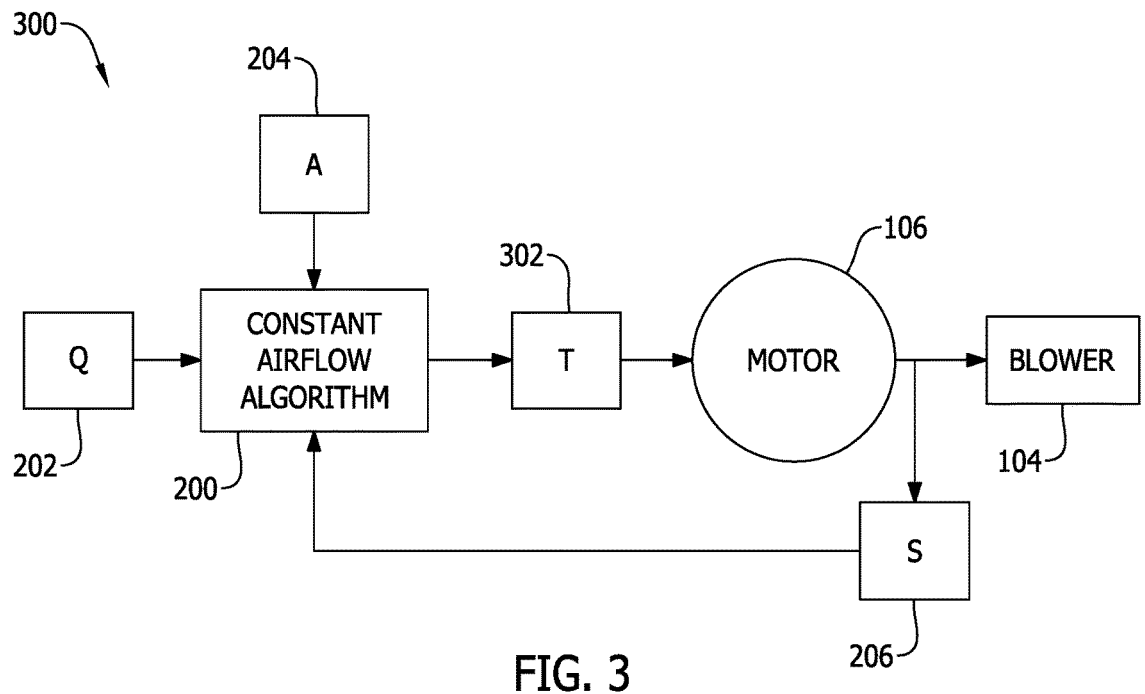
FIG. 3 is a schematic diagram of an exemplary constant airflow control loop for a torque-controlled electric motor.

FIG. 3 is a schematic diagram of one embodiment of constant airflow control loop 300 for use in controlling a torque-controlled electric motor, such as electric motor 106 of constant airflow system 100 (shown in FIG. 1 and FIG. 2). Control loop 300 may be embodied, for example, in motor controller 108 or processor 114, and illustrates control of electric motor 106 by execution of constant airflow algorithm 200 to compute a torque set point 302. Constant airflow algorithm 200 receives airflow rate demand, Q, 202 and measured speed, N, 206, and computes torque set point 302 based on, for example, the polynomial shown in EQ. 1, EQ. 2, or EQ. 3.

Figure 4:
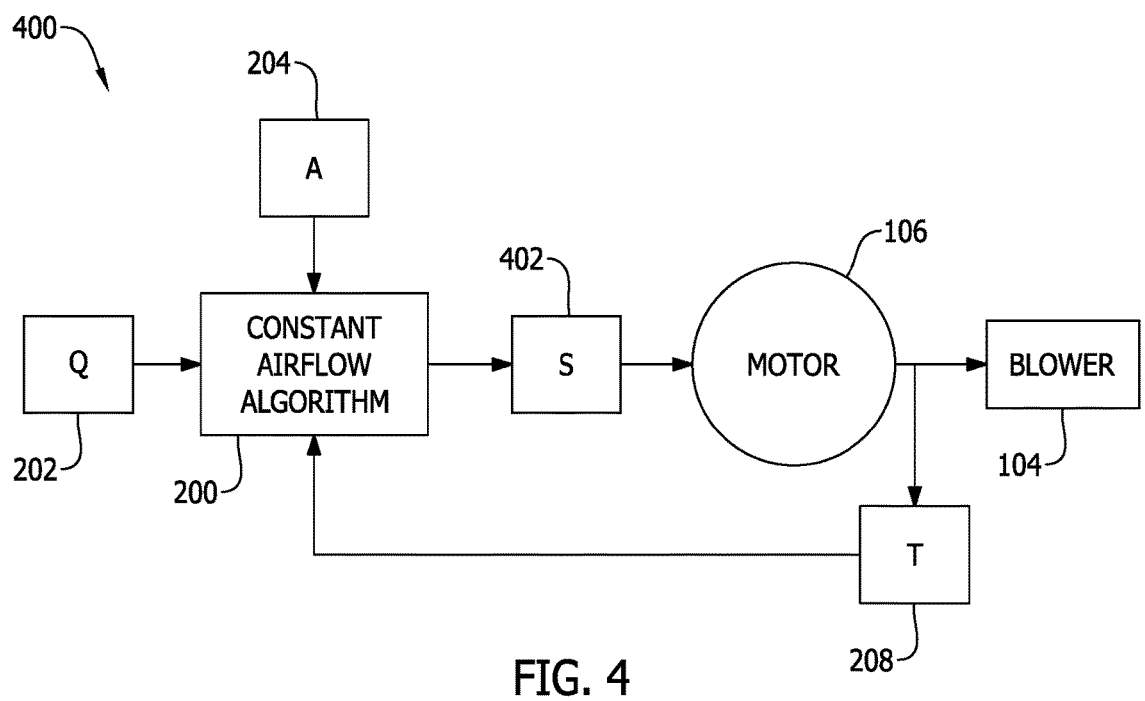
FIG. 4 is a schematic diagram of an exemplary constant airflow control loop for a speed-controlled electric motor.

FIG. 4 is a schematic diagram of one embodiment of a constant airflow control loop 400 for use in controlling a speed-controlled electric motor, such as electric motor 106 of constant airflow system 100 (shown in FIG. 1 and FIG. 2). Control loop 400 may be embodied, for example, in motor controller 108 or processor 114, and illustrates control of electric motor 106 by execution of constant airflow algorithm 200 to compute a speed set point 402. Constant airflow algorithm 200 receives airflow rate demand, Q, 202 and measured torque, T, 208, and computes speed set point 402 based on a polynomial similar to that shown in EQ. 1, EQ. 2, or EQ. 3.

Figure 5:
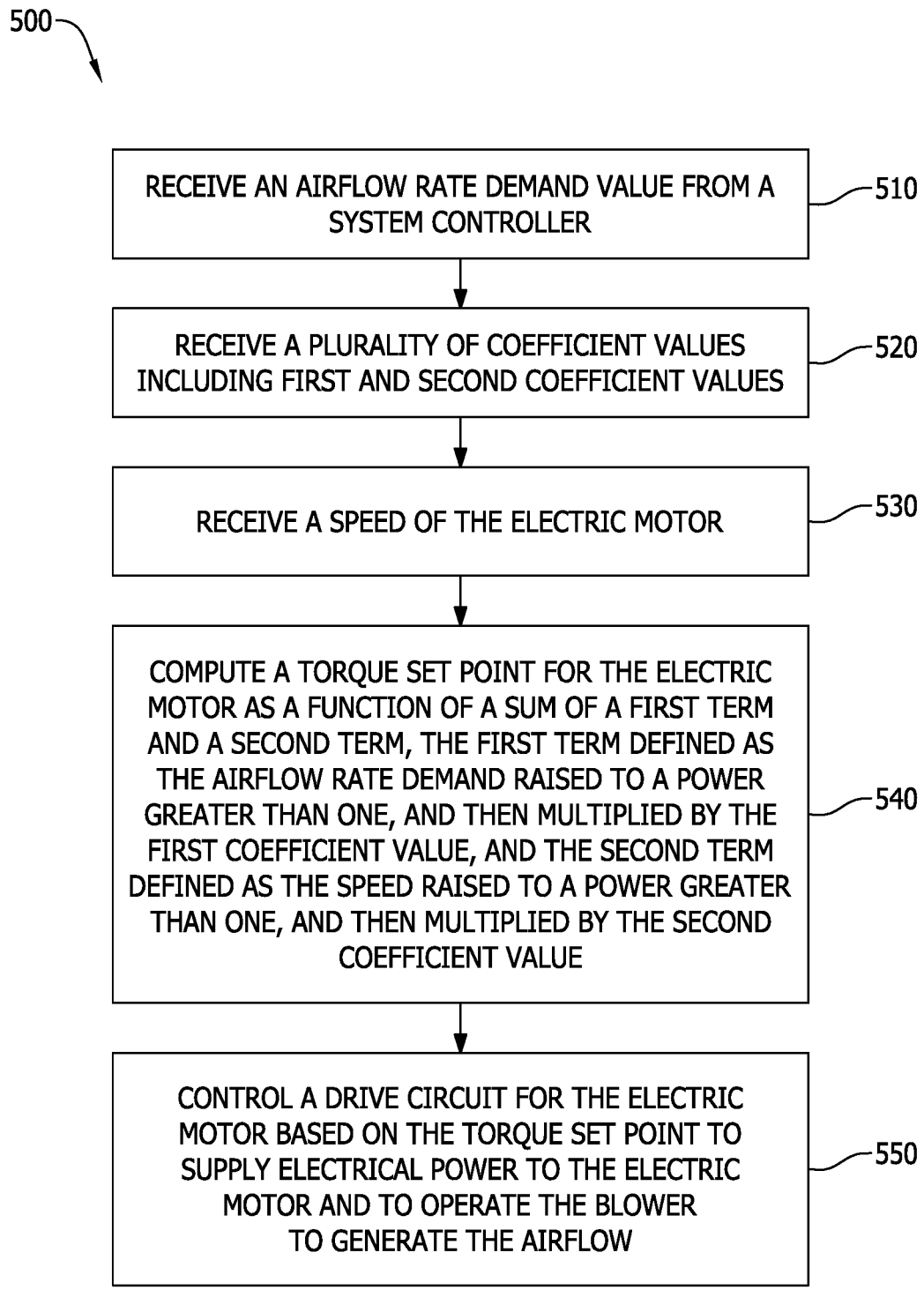
FIG. 5 is a flow diagram of an exemplary method of operating an electric motor configured to drive a blower, such as the blower of the constant airflow system shown in FIG. 1.

FIG. 5 is a flow diagram of an embodiment of a method 500 of operating an electric motor configured to drive a blower, such as electric motor 106 and blower 104 of constant airflow system 100 (shown in FIG. 1). Referring to FIG. 1 and FIG. 5, method 500 may be embodied in a motor controller, such as motor controller 108 (shown in FIG. 1 and FIG. 2). Motor controller 108 receives 510 an airflow rate demand value from system controller 110. The airflow rate demand value may be transmitted as, for example, a digital formatted value or, alternatively, a continuous pulse-width modulated signal representing the desired airflow rate demand. Motor controller 108 also receives 520 a plurality of coefficient values from, for example, system controller 110. The plurality of coefficient values include at least a first coefficient value and a second coefficient value. At least one of motor speed and motor torque is computed 530 based on one or more measured motor parameters such as, for example, current supplied to the stator windings of electric motor 106. More specifically, motor controller 108 may analyze a current signal supplied to the stator windings to compute motor speed, motor torque, or both. In alternative embodiments, at least one of motor speed and motor torque is measured by, for example, sensor system 118 and is received by motor controller 108. Motor controller 108 and, more specifically, processor 114 computes 540 either torque set point 302 or speed set point 402 (shown in FIG. 3 and FIG. 4, respectively) for electric motor 106 by executing an airflow algorithm, e.g., the constant airflow algorithms of EQ. 1, EQ. 2, or EQ. 3. More generally, processor 114 computes 540 either torque set point 302 or speed set point 402 as a function of a sum of at least a first term and a second term. The first term is defined as the first coefficient value multiplied by the airflow rate demand value raised to a power greater than one (e.g., $a_3 Q^{X, X>1}$). The second term is defined as the second coefficient value multiplied by the at least one of the measured torque and the measured speed raised to a power greater than one (e.g., $a_4 N^{Y, Y>1}$ or $a_4 T^{Y, Y>1}$).

The torque set point or the speed set point are then provided to drive circuit 120 to control 550 drive circuit 120. Drive circuit 120 then supplies a current and a frequency of electric power corresponding to the set point to electric motor 106 to operate blower 104 to generate airflow 112.

Figure 6:
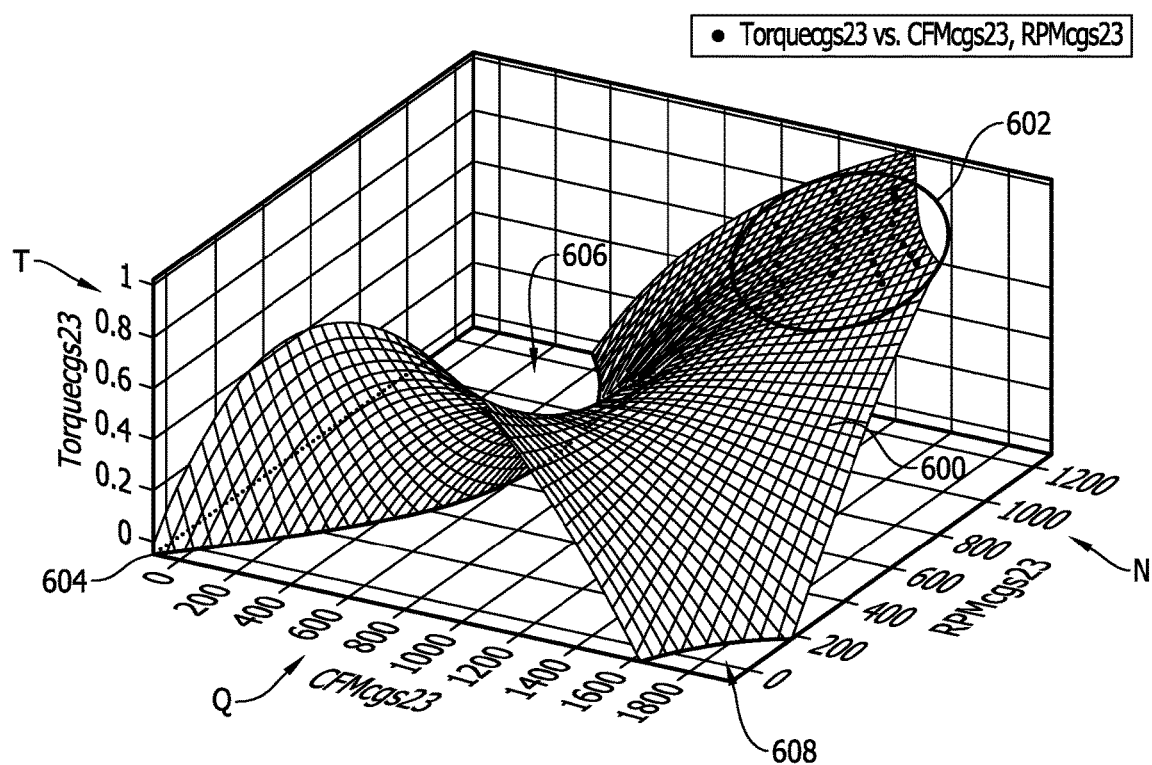
FIG. 6 is a plot of an example surface corresponding to a constant airflow algorithm fit to characterization data.

FIG. 6 is a plot of an example surface 600 correlating to the nine-term constant airflow algorithm described above in EQ. 1, where the characterization data 602 is generally concentrated at high speeds and high volume airflows. The plot is illustrated on three axes that join at an origin 604: torque (T), speed (N), and airflow rate demand (Q). Surface 600 includes regions 606 and 608 where, for the nine-term constant airflow algorithm, the computed torque (T) is zero or negative. Consequently, characterization data 602 would have to be supplemented to avoid such regions on surface 600, or the operating profile would have to be narrowed to exclude certain extrema of torque (T), speed (N), and airflow rate demand (Q). Alternatively, a constant airflow algorithm having fewer terms could produce a coarser fit to the data, and avoids producing a surface having regions similar to regions 606 and 608.

The methods and systems described herein may be implemented using computer programming or engineering techniques including computer software, firmware, hardware or any combination or subset thereof, wherein the technical effect may include at least one of: (a) improving motor performance at low airflow output levels; (b) improving accuracy of estimations of actual airflow; (c) improving the surface fit to characterization data for a given electric motor and blower; (d) maintaining backward compatibility with existing hardware and software interfaces for electric motors and motor controllers; (e) improving thermal comfort and energy savings for operation of constant airflow systems; and (f) improving the ability of the electric motor and blower to match performance of prior-installed electric motors and blower to further support backward-compatibility.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for an electric motor configured to drive a blower to generate an airflow, said motor controller comprising:
    a drive circuit configured to regulate electrical power supplied to a stator of the electric motor to turn a rotor of the electric motor and generate the airflow; and
    a communication interface configured to receive a plurality of coefficient values including at least a first coefficient value and a second coefficient value;
    a processor coupled to said drive circuit and configured to:
        receive an airflow rate demand value;
        compute a speed of the electric motor;
        compute a torque set point for the electric motor as a function of at least a sum of a first term and a second term, the first term defined as the airflow rate demand value raised to a power greater than one, and then multiplied by the first coefficient value, and the second term defined as the speed raised to a power greater than one, and then multiplied by the second coefficient value; and
        control said drive circuit based on the torque set point to supply electrical power to the electric motor and to operate the blower to generate the airflow.

2. The motor controller of claim 1 further comprising a memory configured to store the plurality of coefficient values, and wherein said processor is further configured to retrieve the plurality of coefficient values from said memory.

3. The motor controller of claim 1, wherein said communication interface is further configured to receive the plurality of coefficient values from a system controller.

4. The motor controller of claim 1, wherein the torque set point (T) is computed as a function of the speed (N) and the airflow rate demand value (Q) according to an airflow algorithm defined as:

$$T(N,Q)=a_0+a_1N+a_2N^k+a_3Q^j+a_4QN,$$

wherein j and k are predetermined constant values and the plurality of coefficient values comprises $a_0$, $a_1$, $a_2$, $a_3$, and $a_4$.

5. The motor controller of claim 4, wherein the torque set point (T) is computed as a function of the speed (N) and the airflow rate demand value (Q) according to an airflow algorithm defined as:

$$T(N,Q)=a_0+a_1N+a_2N^k+a_3Q^{1.95}+a_4QN,$$

wherein k is a predetermined constant value and the plurality of coefficient values comprises $a_0$, $a_1$, $a_2$, $a_3$, and $a_4$.

6. The motor controller of claim 4, wherein the torque set point (T) is computed as a function of the speed (N) and the airflow rate demand value (Q) according to an airflow algorithm defined as:

$$T(N,Q)=a_0+a_1Q+a_2N+a_3N^{a6}+a_4Q^j+a_5QN,$$

wherein j is a predetermined constant value and the plurality of coefficient values comprises $a_0$, $a_1$, $a_2$, $a_3$, $a_4$, $a_5$, and $a_6$.

7. A method of operating an electric motor configured to drive a blower to generate an airflow, said method comprising:
   receiving an airflow rate demand value from a system controller;
   receiving a plurality of coefficient values including at least a first coefficient value and a second coefficient value;
   computing a speed of the electric motor;
   computing a torque set point for the electric motor as a function of at least a sum of a first term and a second term, the first term defined as the airflow rate demand value raised to a power greater than one, and then multiplied by the first coefficient value, and the second term defined as the speed raised to a power greater than one, and then multiplied by the second coefficient value; and
   controlling a drive circuit for the electric motor based on the torque set point to supply electrical power to the electric motor and to operate the blower to generate the airflow.

8. The method of claim 7 further comprising:
   receiving a location of a space in a memory; and
   retrieving an airflow algorithm, selected from among a plurality of airflow algorithms, from the space in the memory.

9. The method of claim 7, wherein computing the torque set point comprises computing the torque set point (T) as a function of the speed (N) and the airflow rate demand value (Q) according to an airflow algorithm defined as:

$$T(N,Q)=a_0+a_1N+a_2N^k+a_3Q^j+a_4QN,$$

wherein j and k are predetermined constant values and the plurality of coefficient values comprises $a_0$, $a_1$, $a_2$, $a_3$, and $a_4$.

10. The method of claim 7, wherein computing the torque set point comprises computing the torque set point (T) as a function of the speed (N) and the airflow rate demand value (Q) according to an airflow algorithm defined as:

$$T(N,Q)=a_0+a_1Q+a_2N+a_3Q^{a6}+a_4Q^j+a_5QN,$$

wherein j is a predetermined constant value and the plurality of coefficient values comprises $a_0$, $a_1$, $a_2$, $a_3$, $a_4$, $a_5$, and $a_6$.

11. The method of claim 10 further comprising:
   receiving a location of a space in a memory; and
   retrieving at least two constant values from the space in memory to be respectively substituted for at least two of $a_0$, $a_1$, $a_2$, $a_3$, $a_4$, $a_5$, and $a_6$ in the airflow algorithm.

12. The method of claim 7, wherein receiving the plurality of coefficient values includes receiving at least one non-integer exponent value.

13. The method of claim 7, wherein receiving the speed comprises:
   detecting a frequency at which the electric motor is energized; and
   translating the frequency to a speed of the electric motor.

14. A constant airflow system, comprising:
   a blower;
   an electric motor coupled to and configured to drive said blower to generate an airflow, said electric motor comprising a stator and a rotor coupled to said blower;
   a current sensor coupled to said electric motor and configured to measure a stator current from which a speed of said electric motor is derived; and
   a motor controller coupled to said current sensor, said motor controller comprising a drive circuit configured to regulate electrical power supplied to said stator to turn said rotor and said blower to generate the airflow, and a processor configured to:
      receive an airflow rate demand value and a plurality of coefficient values including at least a first coefficient value and a second coefficient value,
      compute a torque set point for said electric motor as function of at least a sum of a first term and a second term, the first term defined as the airflow rate demand value raised to a power greater than one, and then multiplied by the first coefficient value, and the second term defined as the speed raised to a power greater than one, and then multiplied by the second coefficient value
      control said drive circuit based on the torque set point to supply electrical power to said stator to operate said blower to generate the airflow.

15. The constant airflow system of claim 14, wherein said blower comprises a forward curved blower.

16. The constant airflow system of claim 14 further comprising a system controller configured to transmit the airflow rate demand value to said motor controller.

17. The constant airflow system of claim 16, wherein said motor controller further comprises a communication interface configured to establish a communication channel with said system controller over which the plurality of coefficient values are received.

18. The constant airflow system of claim 14, wherein said motor controller further comprises a memory within which a plurality of airflow rate demand values are stored, and wherein said processor is further configured to retrieve the airflow rate demand value from said memory based on a memory location corresponding to a selection by at least one of a user and a system controller.

19. The constant airflow system of claim 14, wherein said processor is further configured to compute the torque set point (T) as a function of the speed (N) and the airflow rate demand value (Q) according to an airflow algorithm defined as:

$$T(N,Q)=a_0+a_1N+a_2N^k+a_3Q^j+a_4QN,$$

wherein j and k are predetermined constant values and the plurality of coefficient values comprises $a_0$, $a_1$, $a_2$, $a_3$, and $a_4$.

20. The constant airflow system of claim 14, wherein said processor is further configured to compute the torque set point (T) as a function of the speed (N) and the airflow rate demand value (Q) according to an airflow algorithm defined as:

$$T(N,Q)=a_0+a_1Q+a_2N+a_3N^{a6}+a_4Q^j+a_5QN,$$

wherein j is a predetermined constant value and the plurality of coefficient values comprises $a_0$, $a_1$, $a_2$, $a_3$, $a_4$, $a_5$, and $a_6$.

* * * * *